United States Patent [19]

Shackleton

[11] Patent Number: 4,520,369

[45] Date of Patent: May 28, 1985

[54] AIR PILOTED VALVE FOR CONTROLLING START/STOP OF AN INK JET DROP GENERATOR

[75] Inventor: Craig R. Shackleton, Richardson, Tex.

[73] Assignee: The Mead Corporation, Dayton, Ohio

[21] Appl. No.: 612,525

[22] Filed: May 21, 1984

[51] Int. Cl.[3] ..................... G01D 15/18; F16K 31/128

[52] U.S. Cl. ................................ 346/75; 346/140 R; 137/625.5; 137/625.66

[58] Field of Search ............................ 346/75, 140 R; 137/625.5, 625.66

[56] References Cited

U.S. PATENT DOCUMENTS

| | | | |
|---|---|---|---|
| 1,264,856 | 4/1918 | Power | 137/625.5 |
| 3,371,350 | 2/1968 | Sanderson et al. | 346/140 |
| 4,076,046 | 2/1978 | Hieronymus et al. | 137/627.5 |
| 4,079,384 | 3/1978 | Takano et al. | 346/140 |
| 4,080,608 | 3/1978 | Stoneburner et al. | 346/75 |
| 4,237,931 | 12/1980 | Rafaely | 137/625.5 |

OTHER PUBLICATIONS

IBM Tech. Disc. Bulletin, vol. 18, No. 5, Oct. 1975, pp. 1345–1346—Jensen et al.

IBM Tech. Disc. Bulletin, vol. 23, No. 7A, Dec. 1980, pp. 2884–2885—Baker et al.

*Primary Examiner*—E. A. Goldberg

*Assistant Examiner*—Gerald E. Preston

*Attorney, Agent, or Firm*—Biebel, French & Nauman

[57] ABSTRACT

An air piloted hydraulic valve positioned between a source of ink jet fluid and a reservoir containing a plurality of orifices through which streams of continuously flowing droplets are emitted for printing, the valve includes an ink chamber into which the source opens, an outlet opening which permits the ink to flow to the reservoir to form the ink jets, and a bypass opening which permits the flow of ink to pass from the inlet to a remote location for either reuse or dumping. A pair of valve seats are disposed on opposite sides of the ink chamber and a pair of valve sealing members are mounted to a valve stem which extends through the ink chamber and the valve seats so that the sealing members are separately engageable with their respective valve seats as the stem is moved back and forth. A spring urges the valve stem in a direction that causes one of the sealing members to seat on its valve seat to prevent flow of ink from the inlet to the outlet opening and thus permits the flow of ink from the inlet to the bypass opening. An air chamber and movable diaphragm are disposed at the opposite end of the stem and upon introduction of air to the chamber causes the stem to move against the spring and forces the other sealing member to seat against its valve seat and thus closes off the bypass opening and permits ink to pass from the inlet to the outlet opening for supplying ink to the ink jet reservoir.

6 Claims, 5 Drawing Figures

AIR PILOTED VALVE FOR CONTROLLING START/STOP OF AN INK JET DROP GENERATOR

BACKGROUND OF THE INVENTION

1. Field of the Invention

The present invention relates to continuous flow ink jet printing devices and, more particularly, to a device for effectively starting and stopping the flow of ink from the jet drop orifices.

2. Prior Art

Ink jet printing apparatus are fairly well known as is shown, for example, by Beam U.S. Pat. No. 3,577,198 and Mathis U.S. Pat. No. 3,701,998. Such devices include an ink reservoir behind a series of orifices through which ink or other printing liquid is ejected under pressure so as to produce a series of fine streams of droplets. As the droplets break from the main stream issuing from the orifices they pass through charging electrodes and receive a desired charge and subsequently pass through deflection electrodes which adjust the trajectory of the drops as desired to produce a dot matrix pattern on a printing medium or to be caught in a catcher before they impact the medium.

One of the problems associated with such devices is in starting and stopping the flow of liquid from the orifices. The printing operation cannot be initiated until a steady state condition is reached in the issuance of droplets from the orifices, and likewise, during shut down printing must be discontinued in advance of the stopping of the flow of ink from the orifices.

The nonsteady state flow of liquid from the orifices produces several problems in addition to the inability to print during that period. If the flow from the orifices is not initiated fast enough the liquid begins to weep from the orifices and wet the surrounding surfaces as well as form off-center droplets which drop and wet the charging and deflection electrodes, all of which can produce shorting or other electrical problems. Some of the ink which has wept from the orifices remains on the orifice plate and as it evaporates leaves a residue which after build up can eventually affect operation of the apparatus.

On shut down, several problems can also occur if the pressure is not decreased rapidly enough. The same large droplets can form as pressure slowly decreases and results in the same wetting of the orifice plate surface, charge electrodes and deflection electrodes. Also, if a negative pressure occurs the ink is drawn up into the orifices and, in turn, draws air into the reservoir behind the orifices which requires the additional step of purging the reservoir prior to the next startup.

One device which has been utilized in an attempt to overcome the above-described problems is a three-way directional control solenoid valve which is sufficiently fast acting to shut off and start up the flow of ink so as not to produce the undesirable results mentioned. However, such a solenoid valve requires the use of a magnetic steel armature which cannot be made sufficiently corrosion resistant to prevent clogging of the orifices due to loss of rusted material in the ink supply. Additionally, circuitry is needed to try to increase the valve speed and the flat elastomeric seals utilized therein tend to cut and shed particles on the valve orifices and are not speed reproducible due to the "bedding in" action of these seals. As shut down speed is solely a function of the valve spring response time and is consequently slow, the spring force is necessarily small since a stiffer spring would produce a slow start up response time. Therefore, the spring force must be balanced in a compromised position so as not to overly effect either start up or shut down initiation time. Also, constant current to the valve during printing operations draws considerable power and tends to heat the ink flowing to the drop generator which in time tends to clog the valve with viscous ink residue.

Several other methods have been devised for attempting to overcome these problems, but a need still exists for a relatively simple and inexpensive method of achieving a solution to these problems.

SUMMARY OF THE INVENTION

The present invention overcomes the above-described problems and disadvantages associated with the start up and shut down of an ink jet printing apparatus by providing a fast acting valve mechanism closely positioned adjacent the ink jet reservoir so that relatively quick and clean start up and shut down can be achieved.

The present invention uses an air piloted valve to produce fast actuation speed of a spring biased pair of elastomeric seals in very close proximity to an ink drop generator cavity. The design of the valve provides the assistance of hydraulic pressure in the ink to increase valve speed and increase or decrease cavity pressures rapidly so as to produce a quick, clean start and stop of ink flow from the orifices. In the present design, the housing adjacent the ink reservoir which supplies liquid to the orifices is provided with a cylindrical ink chamber with spaced opposed valve seats on opposite ends of the chamber, and the inlet opening from the source of ink enters into the side of the chamber. Adjacent a first of the valve seats outside of the air chamber is a bypass opening which provides a path for ink to a reserve tank or return to the ink source when the ink jet printer is not ejecting droplets from the orifices. An outlet opening from the ink chamber to the reservoir is formed adjacent the second valve seat to provide a path from the inlet opening through the ink chamber to the ink reservoir during operation of the device.

A valve stem extends through the ink chamber and valve seats and supports a pair of sealing members which are spaced apart so as to separately engage the respective valve seats as the stem is moved back and forth in the housing. A spring presses against one of the sealing members to urge it into contact with the second valve seat so that the normal position of the valve prevents ink from flowing from the inlet opening to the printing reservoir.

On the opposite end of the valve stem from the spring is an air chamber formed by the housing and a flexible diaphragm which contacts the opposite end of the stem from the spring. When it is desired to initiate printing, air is introduced into the air chamber causing the diaphragm to bulge outwardly and forcing the stem to move against the action of the spring and thus seat the other sealing member against the first valve seat causing the ink flow path from the inlet to the bypass openings to be closed off and at the same time opening the flow path from the inlet opening to the outlet opening in the reservoir and initiating ink from the orifices.

DETAILED DESCRIPTION OF THE PREFERRED EMBODIMENT

Figure 1:
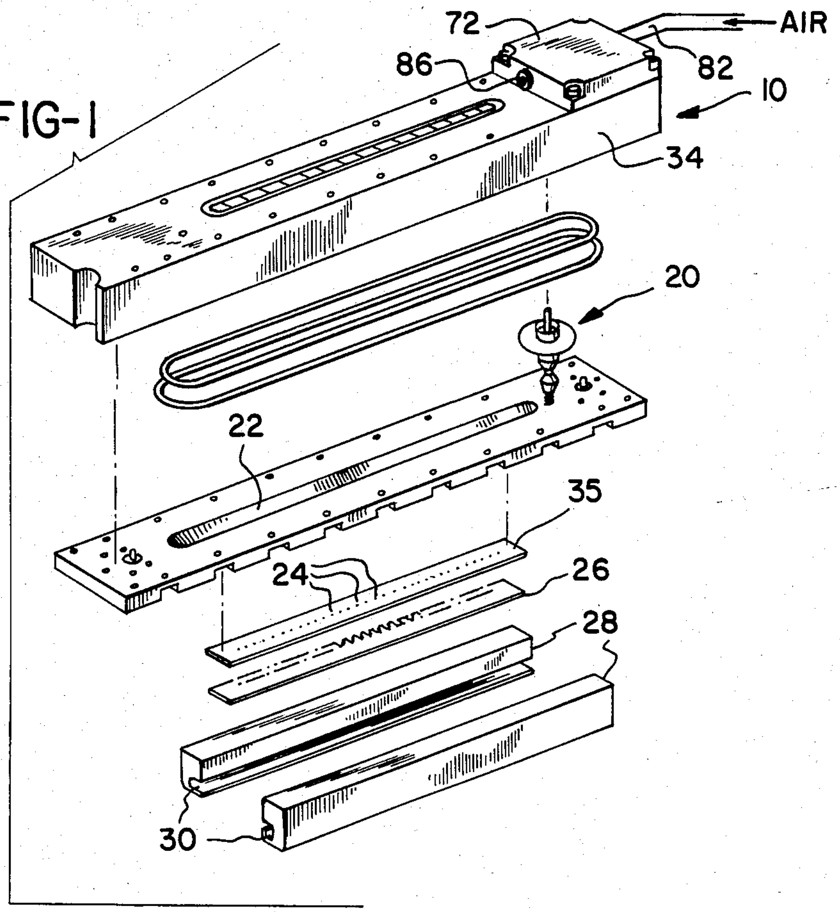
FIG. 1 is an expanded pictorial view of the print head portion of a typical ink jet printing apparatus with the valve of the present invention positioned therein.
Figure 5:
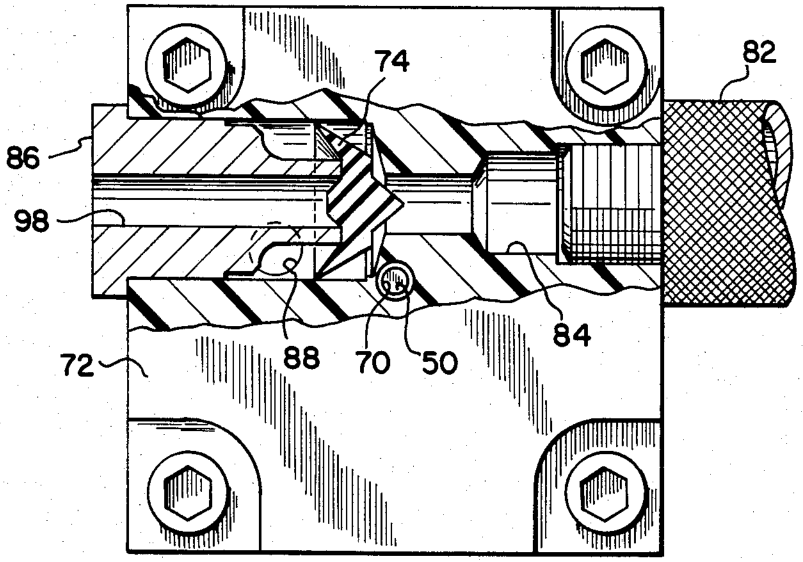
FIG. 5 is an enlarged partially cut-away plan view taken along lines 5—5 of FIG. 2.

FIG. 1 illustrates the general construction of the print head 10 of an ink drop generating device with which the valve construction, shown generally as 20, of the present invention can be utilized to control the ink flow from the source (not shown) to the reservoir 22 from which are expelled the plurality of streams of droplets through small orifices 24. Beneath the orifices are positioned charge and deflection electrodes 26 and 28, respectively, and drop catchers 30 which are utilized in a well known manner to produce a desired printing result on a medium (not shown) positioned below the catchers 30 and generally movable thereunder. Since this general apparatus 10 merely forms an environment for the valve of the present invention, the details of the apparatus will not be discussed further herein except where necessary for an understanding of the present invention.

Figure 3:
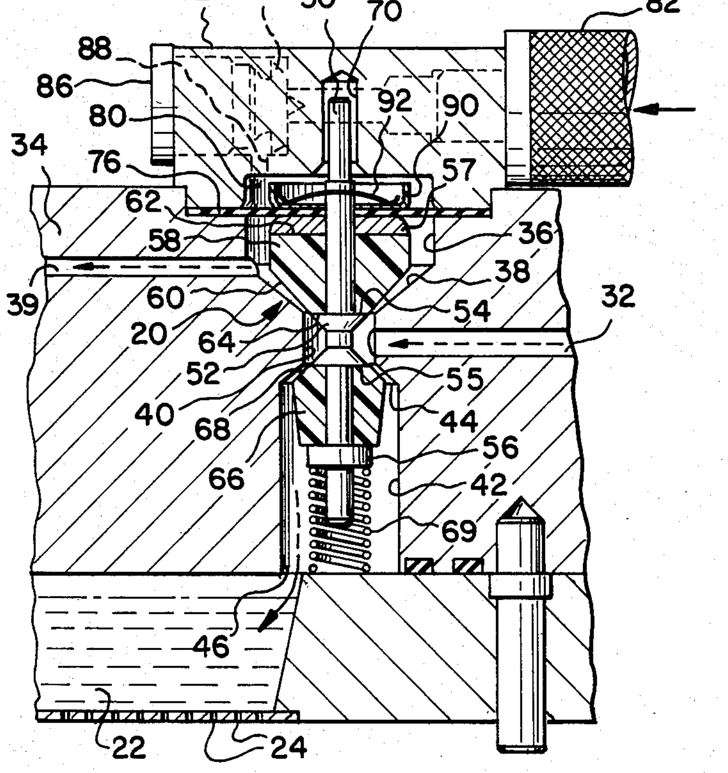
FIG. 3 is an enlarged cross-sectional side view taken along lines 3—3 of FIG. 2.
Figure 4:
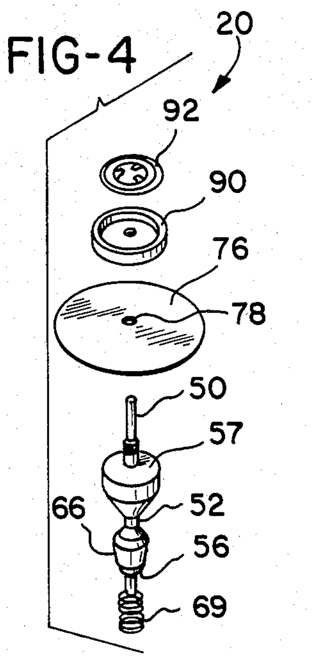
FIG. 4 is an expanded pictorial view of the valve of the present invention.

Ink or other printing liquid is supplied to the reservoir 22 from an ink supply source (not shown) through an inlet opening 32 (see FIG. 3) defined in the housing 34 of the valve 20 which, in the embodiment illustrated, also forms the support for the reservoir 22 and the orifice plate 35 in which orifices 24 are formed.

The valve means 20 of the present invention is fitted into the housing 34 of the ink jet printing device 10. A first bore 36 is formed in the upper portion of housing 34 and terminates in a first conical valve seat 38. A bypass opening 39 opens into bore 36 and seat 38 at their juncture and provides an ink path therefrom to a collection tank (not shown) for return to source. First valve seat 38 joins a concentric cylindrical ink jet chamber 40 into which the inlet opening 32 opens. Another cylindrical bore 42 is formed from the bottom end of housing 34 and terminates in a second valve seat 44 which also joins the ink chamber 40. The lower end 46 of cylindrical bore 42 overlaps the reservoir 22 and provides a flow path for ink from inlet opening 32 through chamber 40, second valve seat 44 and bore 42 to the ink reservoir 22 to supply ink under pressure to the orifices 24.

Positioned in the center of the bores 36 and 42 and extending concentrically through ink chamber 40 and valve seats 38 and 44 is a valve stem 50. Valve stem 50 has a spool-shaped central portion 52 which provides shoulders 54 and 55. On the lower end of the stem 50 is a cylindrical shelf 56, and on the upper end of the stem 50 is a larger diameter cylindrical shelf 57. The stem 50, spool-shaped central portion 52 and cylindrical shelves 56 and 57 can either be formed integrally or in pieces and assembled so long as the shape of the cavity in the housing into which it is to be fitted is taken into account in its design, since, for example, if it is made in a single piece the shelf 56 must be of such a diameter that it can pass through the cylindrical chamber 40. Also, it is preferable that the stem 50 be made of stainless steel, or the like, for corrosion resistance.

Supported on the upper portion of the valve stem 50 is a conically shaped first elastomeric sealing member 58 which has its lower conical surface 60 designed to mate with the first valve seat 38. The upper surface 62 of first sealing member 58 rests against the cylindrical shelf 57 and its lower edge 64 rests against the upper edge 54 of the spool-shaped central portion 52 of the stem.

A second elastomeric sealing member 66 is mounted on the lower portion of stem 50 and has a conical surface 68 shaped to mate with the conical surface of second valve seat 44. It is to be noted that the surfaces 60 and 68 do not necessarily have the same conical angle as the valve seats 38 and 44 since the sealing properties may dictate a different angle which can be determined for given material properties and sealing configuration and location along the valve seats. Sealing member 68 is positioned between the cylindrical shelf 56 and the edge 55 of the spool-shaped central portion 52. The spacing between the conical surfaces of the sealing members 58 and 66 is sufficient that only one of the sealing members can engage its respective valve seat 38 or 44 so that there is always a flow path from the inlet opening 32 to either the reservoir 22 or the bypass opening 39. The sealing members 58 and 66 are preferably made of resilient material so that some movement of the valve stem 50 must occur before either of the sealing members unseats itself from its respective valve seat.

At the lower end of stem 50 and engaging the cylindrical shelf 56 is a compression spring 69 which rests on the upper surface of the body forming the reservoir 22. Compression spring 69, preferably made of stainless steel, urges sealing member 66 into engagement with valve seat 44 to maintain the valve in a normally closed position to prevent ink from flowing from the inlet opening 32 through chamber 40, bore 42 and through the opening 46 into the reservoir 22. As mentioned before, while the valve is in this position a path for ink flow exists from opening 32 through chamber 40, bore 38 and 36 into bypass opening 39.

The upper portion of the valve stem 50 extends into a low friction clearance bore 70 in cap 72 thereby providing a guided stem motion. Cap 72 is bolted into a receiving recess in the upper portion of housing 34. A flexible circular diaphragm 76 is held between the cap 72 and the receiving opening in housing 34 and has a central opening 78 through which the stem extends and provides a tight seal around the stem 50. Defined in the cap 72 is a cylindrical air chamber 80 which is separated from the cylindrical bore 36 by diaphragm 76. Diaphragm 76 thus provides a flexible wall separating the air chamber 80 from the ink in the cylindrical bore 36.

Air chamber 80 is provided with an air supply on demand from an air source 82 which contains an appropriate fast acting control valve which can introduce an air supply fairly quickly to the chamber 80 through the passageway 84 in cap 72. Air may be supplied at a pressure in a range from about 40 to 60 psig. An air relief valve comprising a brass insert 86 and a rubber diaphragm 74 is provided in connection with a passageway 88 leading from the air chamber 80 so that the air supply can be quickly exhausted when desired. Opening and closing of the valve is accomplished by pressurized air acting against diaphragm 74 to open or close a central passage 98 in insert 86.

Diaphragm 76 is secured against the cylindrical shelf 57 by the cap 90 which is held in position by spring clip 92 so that the diaphragm 76 is fixed for movement with the step 50. Thus, as air is introduced into the chamber 80 the diaphragm 76 will expand outwardly against compression spring 69 causing the stem 50 to move downward and thus opening the flow path between the second sealing member 66 and its corresponding valve seat 44 and subsequently causing the first sealing member 58 to engage the first valve seat 38 shutting off the flow path from the inlet 32 to the bypass opening 39. When the air is exhausted from the chamber 80 the valve will return to its original position under the action of compression spring 69 and fluid pressure in cylindrical bore 36 acting against diaphragm 76.

Figure 2:
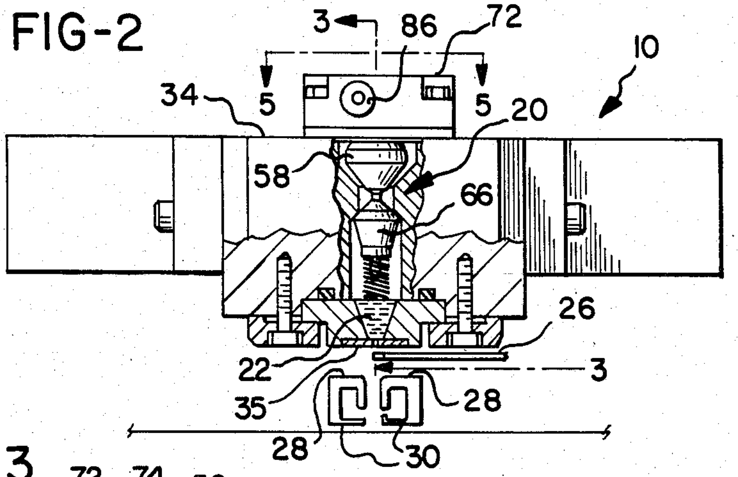
FIG. 2 is an enlarged partial cross-sectional end view of the print head of FIG. 1 illustrating the valve mechanism of the present invention in the closed position.

Referring now in more detail to the sequence of operation of the valve mechanism of the present invention, assuming that the valve is in its normally closed position (as shown in FIG. 2) so that ink is not entering the reservoir 22 but going from opening 32 to bypass opening 39, the air source 82 through a valving mechanism introduces air into chamber 80, diaphragm 76 flexes downwardly displacing some volume of ink in bore 36 and thus increasing the ink pressure surrounding the first sealing member 58 and propagating back into the inlet port 32. The stem begins to move when the air force acting on diaphragm 76 exceeds the net hydraulic force acting on the valve sealing member surfaces and the spring forces. Approximately 0.011 inches of stem travel occurs before sealing member 66 separates from valve seat 44, allowing ink flow into bore 42. The stem 50 continues its motion until sealing member 58 contacts the valve seat 38 and compresses to balance the air actuating air force in excess of the helical compression spring 66 force. This then allows ink to flow from the inlet opening 32 through bore 42 and directly into reservoir 22 so that the printing operation may be initiated. The total stem motion is approximately 0.055 to 0.060 inches.

Upon shut down, the air is exhausted from chamber 80 by turning off the pressurized air supply. This in turn causes automatic opening of the above-described air relief valve. The rapid air pressure release and the force of compression spring 69 act to return the valve to its normally closed position. As the sealing member 58 separates from the valve seat 38 ink pressure from inlet opening 32 and ink reservoir 22 acts upon the diaphragm 76 to cause flexure upward, thus reducing the cavity pressure by rapid displacement of the ink volume surrounding sealing member 58 and by motion of the stem 50 to discontinue flow from inlet opening 32 to reservoir 22. The rapid decrease in ink pressure results in an orderly clean extinguishing of the ink jets.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In an ink jet printing apparatus having an ink supply source connected to an ink reservoir from which ink is expelled for printing, the improvement comprising:

a housing defining an ink flow chamber, an inlet opening for admitting ink from said source to said chamber, an outlet opening for introducing ink to said reservoir from said chamber and a bypass opening for diverting ink from said chamber; first and second valve seats disposed on opposite sides of said chamber, said first seat disposed between said chamber and said bypass opening and said second seat disposed between said chamber and said outlet opening; a valve stem axially movably mounted in said housing and extending through said chamber and said first and second valve seats; spaced first and second sealing members fixedly mounted on said valve stem in spaced relation and separately engageable respectively with said first and second valve seats through movement of said stem; spring means engaging said stem for urging said second sealing member into engagement with said second seat to thereby seal off ink flow from said inlet opening to said outlet opening; air actuated diaphragm means engaging said stem for urging said first sealing member into engagement with said first valve seat upon actuation thereof to thereby seal off said inlet opening from said bypass opening.

2. Apparatus as defined in claim 1 wherein said diaphragm means includes:

said housing defining an air chamber with an opening adjacent said stem, a flexible diaphragm covering said opening in said air chamber so as to separate said air chamber from said ink flow chamber, inlet, outlet and bypass openings, and means for supplying and shutting off on demand an air flow to said air chamber.

3. Apparatus as defined in claim 2 wherein said diaphragm is fixed to said stem adjacent said first sealing member.

4. Apparatus as defined in claim 1 wherein:

said sealing members are deformable and said valve seats are rigid.

5. Apparatus as defined in claim 1 wherein said stem, valve seats and sealing members are all formed with external surfaces of revolution and are coaxially disposed.

6. In an ink jet printing apparatus having an ink supply source connected to an ink reservoir from which ink is expelled for printing, the improvement comprising:

valve means disposed between said ink supply source and said ink reservoir for regulating the flow of ink therebetween, said valve means including a housing having an inlet opening for receiving ink from said ink supply source and an outlet opening for supplying ink to said reservoir defined therein, first and second opposed valve seats disposed on opposite sides of said inlet opening from said ink supply source and having a cylindrical opening defined in said housing extending between said seats, a bypass opening defined in said housing in communication with said first seat, said outlet opening being in communication with said second seat, a valve stem extending through said valve seats and said cylindrical opening coaxial therewith, first and second sealing members engageable respectively with said first and second valve seats and mounted concentrically to said valve stem sufficiently spaced apart such that only one of said sealing members can engage its respective seat at one time while another of said sealing members is adequately spaced from its respective seat to provide an ink path therebetween, spring means urging said second sealing member into engagement with said second seat to provide an ink path from said inlet opening to said bypass opening, a diaphragm mounted in said housing and therewith defining an air chamber, said diaphragm engaging said stem such that expansion of said air chamber due to movement of said diaphragm causes an overriding counterforce opposed to said spring means to cause said first sealing member to engage said first seat and said second sealing member to disengage said second seat to provide an ink path from said inlet opening to said outlet opening.

* * * * *